Oct. 14, 1952　　J. C. RICHARDSON　　2,613,959
COUPLING FOR THREADLESS PIPES
Filed Dec. 3, 1948
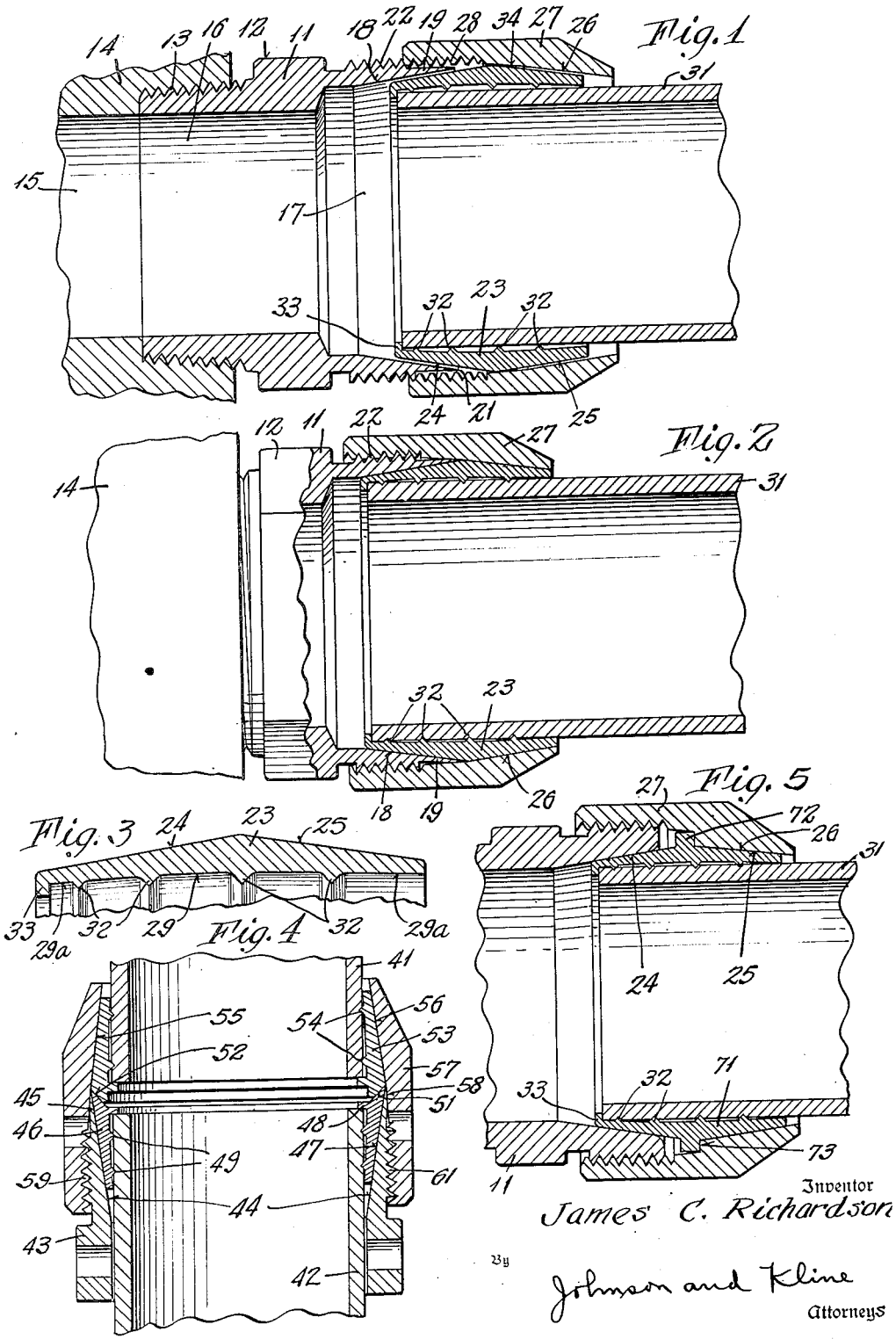
Inventor
James C. Richardson
By
Johnson and Kline
Attorneys Patented Oct. 14, 1952

2,613,959

UNITED STATES PATENT OFFICE 2,613,959

COUPLING FOR THREADLESS PIPES

James C. Richardson, Waterbury, Conn., assignor to The Brockway Company, Naugatuck, Conn., a corporation of Connecticut Application December 3, 1948, Serial No. 63,320

2 Claims. (Cl. 285—122)

This invention relates to couplings for threadless pipe, hollow conduit and the like, hereinafter called "pipe." It relates in particular to the type of coupling, sometimes termed a "compression" coupling, in which a pipe is connected to a fitting or other member without flaring the pipe end or requiring the provision of any flange on the pipe.

Heretofore, threadless pipe couplings when subjected to vibration have tended to loosen sufficiently for the connection to "weep," and sometimes to fail completely after a relatively short period of use. As a result, such couplings have not been successful in airplane installations, railroad equipment, and other fields where vibration is a pronounced factor.

Compression couplings usually include a sealing ferrule, and a still further disadvantage has heretofore resulted from the fact that it has heretofore been thought necessary to provide a rigid shoulder or other abutment on the fitting member for engagement with the end of the pipe to both hold the pipe in proper relative axial position and at the same time provide a reaction point for the forces of compression acting on the pipe engaging ferrule. However, the result of such an abutment tends to prevent the formation of a leak-tight joint by the sealing ferrule.

The present invention provides a pipe coupling of such construction and arrangement as to permit make-up of the coupling without requiring the pipe to abut or otherwise contact the fitting or other member to which it is being coupled, so that sufficient compression of the ferrule to provide a leak-tight joint can be easily obtained.

A further feature of the invention is the provision of a pipe coupling constructed and arranged to have an extended area of contact between the ferrule and the associated fitting and coupling members and a minimum area of contact between the ferrule and the coupled pipe in order to effectively resist the loosening effects of vibration. The extended contact area between the ferrule and the fitting and coupling members provides a maximum resistance to loosening or separation of the parts, while the minimum area of contact between the ferrule and the pipe reduces the amount of vibration which will be transmitted to the coupling from the pipe.

A further feature is the provision in a coupling of a fitting or similar member arranged to provide a radially resilient skirt to be engaged and tensioned by a tapered bore in an associated coupling nut so as to provide a friction lock for holding the nut against unintentional loosening and maintaining it in tight clamping position during vibration, while permitting easy uncoupling thereof when desired.

An additional feature is the provision of an improved compression type coupling which will produce a leak-tight connection without requiring the application of heavy wrench torque, and which can be repeatedly disconnected and reconnected without destroying the effectiveness of the coupling.

These and other features and advantages are accomplished by the present invention.

In the drawings—

Figure 1 is a sectional view through a pipe coupling constructed in accordance with one embodiment of this invention before make-up thereof.

Fig. 2 is a similar view showing the coupling of Fig. 1 after make-up.

Fig. 3 is a partial sectional view on an enlarged scale of the clamping ferrule used in Fig. 1.

Fig. 4 is a view similar to Fig. 1 of a modified coupling especially adapted for connecting together sections of oil well casing.

Fig. 5 is a sectional view of a further embodiment of the pipe coupling shown in Figs. 1 and 2.

The illustrated embodiment of the invention is shown in connection with a fitting member 11 having a hexagonal wrench surface 12 and a threaded end 13 for connection to an associated apparatus 14 having a bore 15 with which the bore 16 of the fitting is aligned. The projecting end of the fitting has a flared mouth 17 shaped to provide a concave, conical, sealing surface 18 surrounding the bore 16 and forming the inner surface of a somewhat elongated, radially resilient skirt 19, terminating in a substantially feather edge 21, the purpose of which will be explained hereafter. External threads 22 are provided on the fitting member adjacent the resilient skirt 19.

The coupling includes a compressible sealing ferrule 23 which is illustrated as having a relatively elongated body portion formed at one end with a convex tapered face 24 adapted to engage the concave tapered sealing surface 18 of the fitting 11, and at the other end a convex, oppositely tapered surface 25 adapted to engage the inner tapered bore 26 in a coupling nut 27. The nut has threads 28 for engagement with the threads 22 on the fitting member.

The inner surface 29 of the ferrule 23 has a plurality of spaced ridges 32 extending continuously around the inner surface and adapted to surround the pipe 31. The faces of the ridges 32 are preferably formed at substantially right angles to each other to penetrate the pipe surface upon compression of the ferrule and provide a leak-tight joint between the pipe and ferrule. The inner surfaces 29a at each end of the ferrule are of slightly less diameter than the surface 29 between the ridges 32 so that upon compression of the ferrule it will engage the pipe surface at the end surfaces 29a only. Means such as an annular flange 33 at the end of the ferrule adjacent the fitting member 11 engages the end of the pipe 31 to maintain the ferrule and pipe in proper relative position and hold the pipe and ferrule against relative axial movement, during make-up.

The coupling nut 27 is provided with a skirt-engaging surface 34 at the inner end of the tapered ferrule engaging surface 26. The skirt-engaging surface 34 is slightly conical but formed at a smaller angle with the axis of the nut than is the surface 26.

In connecting the pipe 31 to the fitting member 11, the coupling nut 27 and the sealing ferrule 23 are slid over the end of the pipe, the flange 33 on the end of the ferrule determining the relative position of the pipe and ferrule, the nut being positioned around the ferrule. The pipe end and surrounding ferrule are positioned inside the flaring mouth 17 of the fitting member 11. The coupling nut and the fitting member are then drawn together by means of the threaded connection 22, 28 to make up the joint. In this operation the tapered bore 26 of the nut 27 causes the ferrule 23 to be advanced into the fitting 11. This movement compresses the tapered end surface 24 of the ferrule 23 against the concave conical sealing surface 18 of the fitting member 11 over the entire length of the tapered surface 24 to form a leak-tight connection between the fitting member and the ferrule. At the same time movement of the conical sealing surface 18 and the tapered bore 26 of the coupling nut toward each other acts to radially compress the ferrule 23 inward, causing the ridges 32 to penetrate the pipe surface and form a leak-tight connection therewith. In this operation, as illustrated in Fig. 2, the ferrule is compressed sufficiently to cause the ridges to penetrate the pipe surface and to compress the end surfaces 29a into engagement with the pipe, as indicated in Fig. 1. Centrally of the ferrule, the inner surface 29 between the ridges 32 is not in direct contact with the pipe surface. This reduces the contact area to a minimum and greatly lessens the transmission of vibration from the pipe 31 to the coupling members.

The conical face 34 in the coupling nut 27 engages the flexible skirt 19 on the fitting member and tends to compress it inwardly against the natural resilience thereof and into engagement with the tapered surface 24 of the ferrule 23. As a result, sufficient friction is established between the skirt 19 and the coupling nut 27 to constitute a nut lock capable of retaining the nut against unintentional loosening as a result of vibration, while permitting easy loosening thereof on the application of a wrench thereto.

Fig. 4 illustrates a further embodiment of the invention and the application thereof to connecting oil well casings together in the field usually while the sections are being lowered into a well. In this embodiment, two casing sections 41, 42 are shown. A fitting member 43 is provided having a flaring mouth 44 forming a conical concave sealing surface and a radially flexible skirt 45 adapted to surround the lower casing section 42. In this embodiment, the sealing ferrule is sectional. One section 46 has a tapered surface 47 adapted to engage and cooperate with the sealing surface 44 on the fitting member 43. This ferrule section 46 has a flange 48 adapted to engage the upper end of the casing section 42 to support the ferrule section thereon. This ferrule section also has a plurality of pipe penetrating ridges 49 which slidably embrace the casing section prior to make-up of the coupling. The section 46 has a concave mouth or surface 51 for engaging and supporting a convex conical surface 52 on the lower end of a second ferrule section 53 having spaced casing penetrating ridges 54 and an outer, elongated tapered surface 55 adapted to engage the tapered inner bore 56 of a coupling nut 57. The nut 57 also has a slightly tapered surface 58 adapted to flex the resilient locking skirt 45 of the fitting member 43. The coupling nut has threads 59 cooperating with threads 61 on the fitting member 43.

In this embodiment, the fitting member 43 is placed around the upper end of the oil well casing section 42 as it is lowered into a well. The lower ferrule section 46 is then positioned around the upper end of the casing and supported in place by the flange 48. The upper casing section 41 with the surrounding ferrule section 53 and coupling nut 57 thereon is then aligned with the lower section. The lower end of the upper ferrule section fitting is located within the conical sealing surface 51 of the opposite section 46. Thereupon, threading the fitting member 43 and the coupling nut together, causes the tapered lower ferrule section 47 to be pressed into leak-tight engagement with the conical sealing surface 44 of the fitting member 43. At the same time, both ferrule sections are radially compressed to force the ridges 49 and 54 respectively to penetrate the surfaces of the oil well sections in leak-tight engagement while leaving the central inner surfaces of the both ferrule sections spaced sufficiently from the casing surfaces to reduce to a minimum the transmission of vibration from the casing to the coupling parts. The tapered engaging surfaces 51 and 52 between the two ferrule sections 46 and 53 are pressed together into leak-tight engagement while the coupling nut 57 compresses the flexible skirt 45 to tension the nut and lock it against loosening by vibration.

The embodiment illustrated in Fig. 5 is arranged to resist longitudinal forces which result when the pipe is subjected to a strong pull or tension. In this form, as shown, the ferrule 71 has a circumferential flange 72 surrounding the ferrule at the apex of the tapered end surfaces 24, 25. The coupling nut 27 has a flange engaging shoulder 73. It will be apparent that tension on the pipe 31 will result in pressure of the flange 72 against the shoulder 73. This will tend to deflect or bend the shoulder to the left as in Fig. 5, in turn flexing the body of the ferrule under the face 24 to increase the pressure of the ferrule body on the pipe 31. This increases the penetration of the adjacent ridges 32 into the pipe and secures the pipe and coupling against loosening.

Upon disconnecting the coupling after a sealing operation I have found the sealing ferrule to be easily rotatable relative to the pipe but securely held against longitudinal movement on the pipe, indicating that the ridge or ridges 31 had penetrated the pipe wall sufficiently to form a leak-tight connection which is not affected by disconnecting the coupling.

In the present invention, I prefer to avoid case hardening of the ferrule. I have provided leak-tight joints with steel pipe by employing ferrules having a hardness of approximately 30 to 40 Rockwell C throughout. In the case of brass pipe, the composition of the ferrule should be slightly harder than that of the pipe, but of substantially the same degree of hardness throughout.

The present coupling will make up without causing axial movement of the pipe relative to the associated fitting and also without causing axial movement of the sealing ferrule after the sealing surfaces are once in contact. This permits the construction being used to connect a pipe, for example, between rigidly mounted fitting members located a fixed distance apart. The coupling can also be disconnected and reconnected repeatedly without lessening the effectiveness of the seal.

Obviously, the invention can be variously modified and adapted, and portions of the improvements can be used without others.

I claim:

1. A vibration resistant pipe coupling for use in connecting pipe to a fitting member or the like, comprising a concave conical sealing surface formed on said fitting member so as to provide an extended tapered body portion terminating in an annular radially flexible skirt, a compressible ferrule slidable relatively to said pipe having a convex tapered surface at each end and a bore provided with a pipe encircling ridge, one of said tapered end surfaces engaging the conical sealing surface on said fitting member, a coupling nut threaded to said fitting member surrounding said ferrule and having a tapered bore shaped to engage the other tapered surface on said ferrule, a portion of said bore forming a skirt-engaging surface tapered at an angle to the nut axis less than the balance of said bore for engagement with the outer surface of said resilient skirt whereby when said fitting member and nut are threaded together one tapered surface on said ferrule is pressed into leak-tight engagement with the conical sealing surface on said fitting member and said ferrule is compressed radially to force said ridge to penetrate the pipe surface and form a leak-tight engagement therewith, and the bore of said nut engages said skirt so as to frictionally lock said nut against loosening by vibration.

2. A vibration resistant pipe coupling for use in connecting a pipe to a fitting member or the like, comprising a sealing surface formed on said fitting member so as to provide an extended body portion terminating in an annular radially resilient skirt having smooth, unthreaded inner and outer surfaces, a ferrule slidable relatively to said pipe having a surface engaging said sealing surface on said fitting member and a plurality of pipe encircling ridges, a coupling nut threaded to said fitting member surrounding said ferrule and having a bore engaging said ferrule and said skirt, said ferrule and the said bore being shaped so that when said fitting member and said nut are threaded together the end portions only of said ferrule are pressed against said pipe leaving the central portion of said ferrule between said ridges spaced from the pipe surface, while the ferrule surface in engagement with the sealing surface on said fitting member is pressed into leak-tight engagement therewith and said ridges are caused to penetrate the pipe surface to form a leak-tight joint therewith, and said nut flexes said skirt so as to be frictionally held against loosening by vibration.

JAMES C. RICHARDSON.

REFERENCES CITED

The following references are of record in the file of this patent:

UNITED STATES PATENTS

| Number | Name | Date |
|---|---|---|
| 1,586,793 | Fowler | June 1, 1926 |
| 1,793,455 | Buchanan | Feb. 24, 1931 |
| 2,233,214 | Lamont | Feb. 25, 1941 |
| 2,458,833 | Carignan | Jan. 11, 1949 |
| 2,463,407 | Melton | Mar. 1, 1949 |

FOREIGN PATENTS

| Number | Country | Date |
|---|---|---|
| 391,140 | Great Britain | Apr. 18, 1933 |